United States Patent
Kane et al.

(10) Patent No.: US 9,342,210 B2
(45) Date of Patent: May 17, 2016

(54) VIDEO MIXING METHOD AND SYSTEM

(71) Applicant: Public Picture LLC, Brooklyn, NY (US)

(72) Inventors: Alexander Kane, Brooklyn, NY (US); Benjamin S Jenkins, New York, NY (US)

(73) Assignee: PUBLIC PICTURE LLC, Brooklyn, NY (US)

( * ) Notice: Subject to any disclaimer, the term of this patent is extended or adjusted under 35 U.S.C. 154(b) by 198 days.

(21) Appl. No.: 14/275,963

(22) Filed: May 13, 2014

(65) Prior Publication Data

US 2014/0344700 A1 Nov. 20, 2014

Related U.S. Application Data

(60) Provisional application No. 61/824,419, filed on May 17, 2013.

(51) Int. Cl.
| | |
|---|---|
| *G06F 3/00* | (2006.01) |
| *G06F 3/0481* | (2013.01) |
| *G11B 27/34* | (2006.01) |
| *G06F 3/0488* | (2013.01) |
| *G11B 27/031* | (2006.01) |
| *H04N 5/265* | (2006.01) |
| *H04N 21/85* | (2011.01) |

(52) U.S. Cl.
CPC .......... *G06F 3/0481* (2013.01); *G06F 3/04817* (2013.01); *G06F 3/04886* (2013.01); *G11B 27/031* (2013.01); *G11B 27/34* (2013.01); *H04N 5/265* (2013.01); *G06F 2203/04803* (2013.01); *H04N 21/85* (2013.01)

(58) Field of Classification Search
CPC ....................................................... H04N 5/265
USPC .................................................. 715/726, 723
See application file for complete search history.

(56) References Cited

U.S. PATENT DOCUMENTS

| | | | | |
|---|---|---|---|---|
| 8,875,031 | B2* | 10/2014 | Periyannan | H04N 7/141 715/753 |
| 9,171,577 | B1* | 10/2015 | Newman | G11B 27/031 |
| 2010/0027961 | A1* | 2/2010 | Gentile | G06T 5/50 386/278 |
| 2011/0311199 | A1* | 12/2011 | Fay | G11B 27/034 386/241 |
| 2013/0195429 | A1* | 8/2013 | Fay | H04N 9/87 386/278 |
| 2014/0092203 | A1* | 4/2014 | Periyannan | H04N 7/141 348/14.09 |

* cited by examiner

*Primary Examiner* — William Titcomb
(74) *Attorney, Agent, or Firm* — Weitzman Law Offices, LLC

(57) ABSTRACT

A video mixing computer apparatus includes a computing device, a touch interface having multiple selectable tiles, at least some of the tiles each having an associated media viewer capable of playing a visual source in response to selection of the tile. The compositing engine, tiles, media viewers, and compositing engine interoperate such that, when a user selects a first tile, a part of a first visual source will be played by a first media player, and when the user then selects a second tile, a part of a second visual source will be played by a second media player, and concurrent with the playing, information relating to the parts will be captured for use by the compositing engine to create a media file as a sequential mix of the first and second visual sources corresponding to the user's selections' timings and durations. A video mixing method is also described.

20 Claims, 8 Drawing Sheets

VIDEO MIXING METHOD AND SYSTEM

CROSS REFERENCE TO RELATED APPLICATION

This application claims the priority benefit of U.S. Provisional Patent Application No. 61/824,419, filed May 17, 2013. The entirety of which is incorporated herein by reference in its entirety, as if fully set forth herein.

BACKGROUND

1. Field

This disclosure relates generally to computers and, more particularly, to computerized video mixing.

2. Background

Current approaches video mixing and non-linear editing require using sophisticated tools, such as Lightworks, Cinelerra, and are generally fairly complex efforts, requiring pre configuration and editing of any videos to be used or alternating steps of editing and insertion. This approach can be very time consuming and requires use of a non-intuitive interface that is not casual-user friendly at all.

Although more simplified editors, like iMovie and FinalCut from Apple, exist and provide a more simplified, and thus more user-friendly, interface the same types of steps must be performed as with the higher end video mixing and non-linear editing tools.

It is also believed that none of the foregoing tools can easily be used with streaming video, without first converting and saving the streaming video as a normal media file and editing it in the conventional manner, nor can such tools easily be used to create video mixes "on the fly" as the streams are received.

Thus, there is a need for a method and system that allows one to perform video mixing in a manner that is simple and intuitive so that even casual users can easily create video mixes.

BRIEF SUMMARY

We have developed a method and system that makes video mixing easier and provides a simplified interface for doing so.

The foregoing and following discussion outlines rather generally the features and technical advantages of one or more embodiments of this disclosure in order that the following detailed description may be better understood. Additional features and advantages of this disclosure will be described herein and may be the subject of claims of this application.

BRIEF DESCRIPTION OF THE DRAWINGS

This disclosure is further described in the detailed description that follows, with reference to the drawings, in which.

DETAILED DESCRIPTION

We have developed a multi-visual mixing apparatus and method that is elegantly simple and intuitive, allowing almost anyone to easily create professional looking mixes from multiple visual sources while each selected source is concurrently played or displayed upon its selection. In this regard, it should be noted that, as used herein, the terms "displayed" and "played" are intended to be interchangeable and identical in scope, the difference often being that "displayed" is used when the discussion is from a user or viewer standpoint, whereas "played" generally is used when the discussion is from the perspective of the internal operation associated with display of video to a user or viewer.

Figure 1:
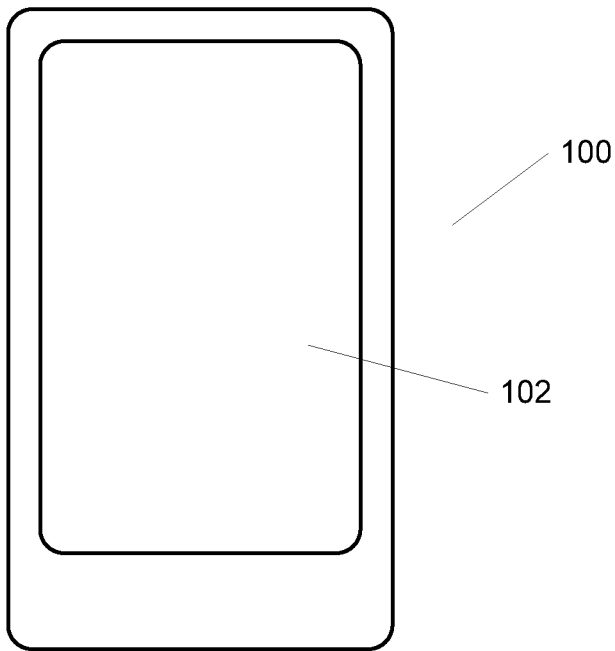
FIG. 1 illustrates, in simplified form, a device having a conventional touch screen.
Figure 2:
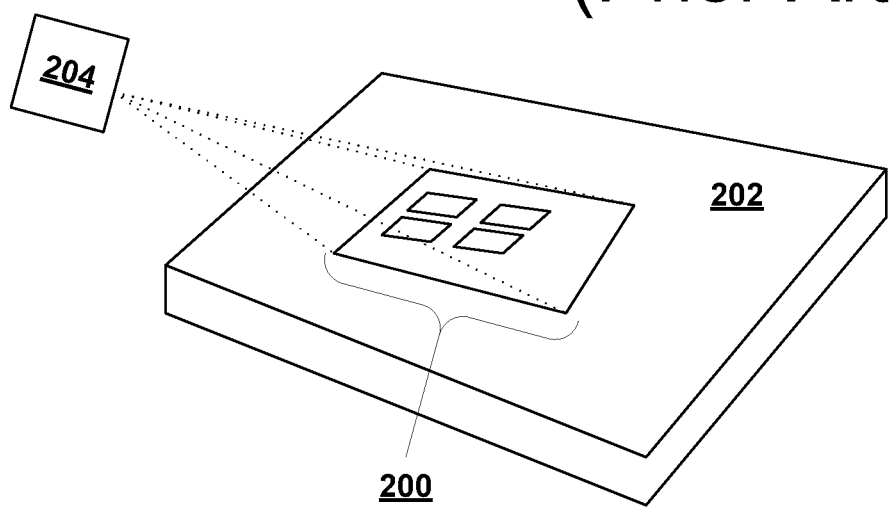
FIG. 2 illustrates, in simplified form, a projected user interface, multi-touch projected display, gestural interface, or other virtual/detected interface which allows a user to interact with a personal computer, tablet computer, gaming console, smart phone or other computing device.

Before describing the details of the method and system, it should be noted that, as used herein, the term "touch interface" is intended to mean and encompass: (i) a device 100 having a conventional touch screen 102 as shown in FIG. 1, irrespective of whether the device 100 is a personal computer, tablet computer, gaming console, smart phone or other computing device, which relies upon some form of physical contact to enable a user to interact directly with what is displayed on the screen, rather than using a mouse, touchpad, or other intermediate device (other than a stylus, which is typically used as a surrogate for a finger and typically now optional for most touch screens), as well as, (ii) a virtual interface 200 as shown in FIG. 2, such as a projected user interface, multi-touch projected display, gestural interface, or other virtual/detected interface which allows a user to interact with a personal computer, tablet computer, gaming console, smart phone or other computing device via an interface that is projected onto a surface 202 and interoperates with a component 204 that detects specific gestures or movement in space or on the surface. Representative non-limiting examples of other such virtual interfaces as referred to in (ii) include those shown and described in U.S. Pat. No. 8,212,768, U.S. Pat. No. 8,022,942, U.S. Pat. Pub. No. 2012/0299876, U.S. Pat. Pub. No. 2013/0027548 and U.S. Pat. Pub. No. 2013/0016070, the entirety of all these U.S. Patents and U.S. Pat. Publications are all incorporated herein by reference.

In addition, the term "visual source" is intended to broadly mean any video, picture, animation or visual effect that can be stored and later played, or can be viewed using a media viewer, including buffered streaming video. In this regard, it is intended that a "visual source" could be a file in any container file format and/or requiring use of a particular codec to make it possible for a human to view the file content, provided that visual source and media viewer are compatible with each other. For example, if a visual source is stored as an H.264 (.mp4) file, the media viewer must have the appropriate codec for playing an .mp4 format file. Likewise, if the visual source is some other video file, the media viewer must have the right codec to play such file. Similarly, if the visual source is a picture file, like a .jpg, .bmp. png or other picture file, the media viewer must be capable of displaying that file. Representative examples of media viewers usable with the method and system described herein may include, but are by no means intended to be limited to: Media Player Classic, currently available from (http://mpc-hc.org), VideoLAN Client (VLC), currently available from (http://videolan.org), RealPlayer, currently available from (http://www.real.com/realplayer), GOM Media Player, currently available from (http://player.gomlab.com/eng/), Winamp, currently available from (http://www.winamp.com/) and QuickTime player, currently available from (http://www.apple.com/quicktime/download/), to name a few. As noted above, it should be understood that any media viewer capable of operating consistent with the description herein can be used.

Finally, as used herein, the term "tile" is intended to refer to an area that can be, or is, associated with a particular visual source and acts as the touch interface with respect to effecting display of that visual source upon selection.

It should also be understood that each device 100 will include a processor, program storage which can be used to hold operating system programming as well as application programming such as the media viewers, audio players, programming that implements and controls the touch interface in terms of operation and configuration, programming that implements any available enhancements that can be applied to a video like effects and filters, or any other programming necessary to effect operation of implementations consistent with the description herein, memory and or buffers that can be used for storage of video files, audio files, animations, input-output (I/O) hardware and associated software, and any other aspects of the conventional devices 100 referenced above that are needed to implement a variant of the methods and systems described herein.

In simplified general overview, from the user perspective, the method and system uses a touch interface configured as set of tiles, with one tile for each selectable visual source being selectable via the touch interface. In general, a user performs mixing of different visual sources by sequential selection of particular tiles, which causes the selected visual source to be played or displayed within the tile until a new source is similarly selected, and along with the selection timing and other optional gestures of the user during play or display, which are used in creating the final mix output.

With the preceding backdrop in mind, different variants of the method and system will be described with reference to the various figures, first from the user perspective and then with respect to the underlying back-end components and operation.

Figure 3:
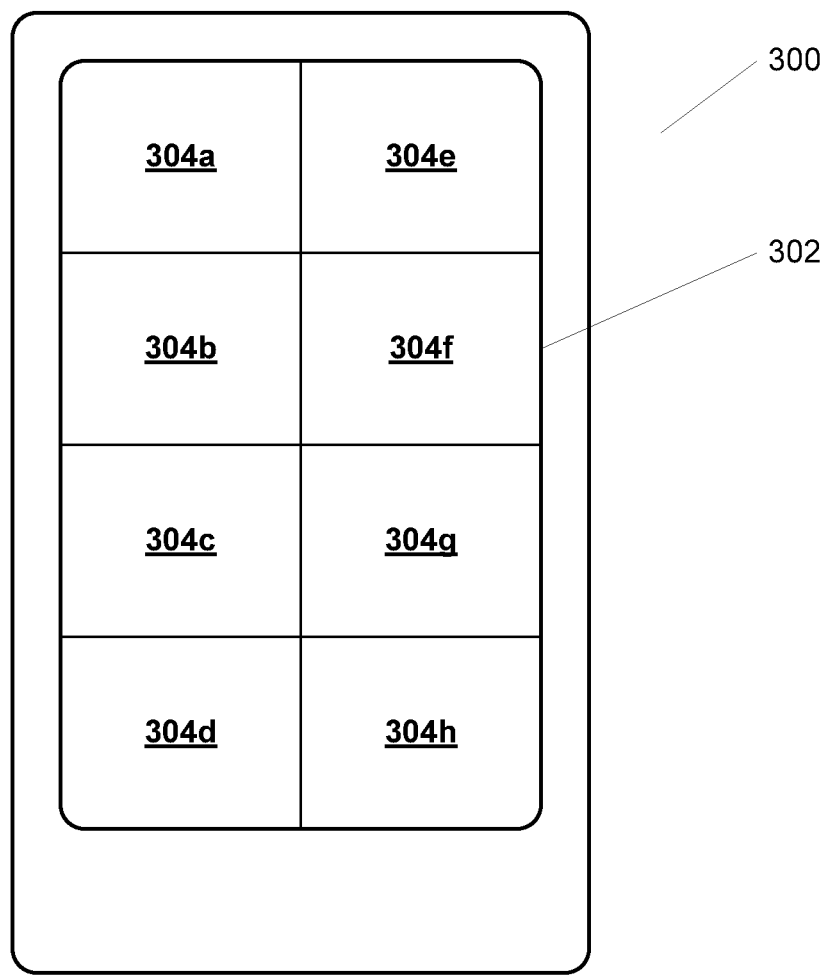
FIG. 3 illustrates, in simplified form, a device having a touch interface as described above.

FIG. 3 illustrates, in simplified form, a device 300 having a touch interface 302 as described above. The touch interface 302 is divided, through programming into tiles 304a, 304b, 304c, 304d, 304e, 304f, 304g, 304h as described above. For purposes of example only, in this case, the tiles are configured as a 2×4 rectangular array. In operation, each tile is the visual display a media viewer through which a visual source can be selected and viewed. Initially, user respectively associates at least two of the individual tiles with a different visual source each.

In the case of a visual source that is a video clip or animation, the association of that clip with a particular file typically causes the first image or key frame to be displayed in the tile. In the case streamed video being the visual source, a "current" (i.e. at the time of associating) image from the stream may be displayed In the case of a picture, the association of a tile with a picture will typically cause the associated picture to be displayed in the tile.

Alternatively or optionally, the system can be configured to automatically associate one, some or all of the tiles with different visual source items, for example, selected from the most recent files in one or more specified folders, or from some specified location.

In addition, with typical implementations, an audio file will also be assigned (either as a default or as part of the visual source assignment to tiles) and will serve as the continuing background for the created video mix. Depending upon the particular implementation, the audio can be a single file or a set of files to be sequentially or randomly played (i.e. a playlist), and can be configured to play once or continuously until stopped. Alternatively, with some implementations, the audio associated with each visual source can also switch and become the audio for the mix as individual tiles are selected for display. Still other implementations can be configured so that there is no underlying audio track at all. Such implementations allow for more audio freedom if the video mixing and display is occurring while a disc jockey (DJ) is playing music separately, but also introduce drawbacks because very close coordination between the person doing the mixing and the DJ will be required or the resulting combinations may be less than pleasing or interesting.

Alternatively, for some implementations, the visual source and/or audio source can come from an available set of feeds which, in different implementations may be, stored files and/or live, and may further optionally be categorized in some fashion, for example, by genre, style, popularity, "featured", date/time added, content source, who loaded it, the country of origin, type of media, etc. In addition, in some implementations, a feed can be a existing mix can be used as a source per se, or it can be broken up into multiple feeds such that the "mix" could actually then be "remixed" as described below.

Once all of the desired tiles have been associated with a visual source (and, in appropriate implementations, the underlying audio has been selected), the user can begin the actual mixing process as follows.

The mixing process begins with the user selecting one of the tiles. Depending upon the particular implementation and interface, this will involve either touching the interface screen or making the appropriate selection movement within the boundary area of the tile displaying the desired visual source. In simplest case implementations, immediately upon selection, that visual source will begin being played/displayed, and will continue to be played/displayed until a new tile is selected. In addition, as the first selection, playing of the audio file will also begin. Upon the user's selection of a new tile, the first visual source selection will stop being played/displayed and the visual source for the newly selected tile will begin playing and being displayed in its place. The user can continue by again selecting a new tile, in which case that tile's visual source will begin in place of the one currently being played/displayed as just described. In the case where the new tile was already used in this mix (i.e. it is a previously selected tile), the play/display will either restart from the beginning or will resume from the point where it last stopped, depending upon the implementation or configuration.

Advantageously, more complex implementations can optionally allow for gestures, such as a single finger swipe, a single finger slide, a multi-point swipe or slide, a rotational movement (like twisting a knob with two or more fingers), a tapping motion, a pinching or reverse-pinching (expanding) motion, to name a few, to affect the display. Depending upon the particular implementation, the particular gesture can be used to enhance the playback in some manner, for example, slow down or speed up the visual source display, create a stutter or scratch effect, zoom in or zoom out, or cause the visual source display to rotate or spin. It should be understood in this regard that the gestures are only limited by the ability of the touch interface to discern it, the particular action resulting from the gesture only being limited by the capability of the media viewer, and the particular gesture used to invoke a specific action will be a matter of design choice, although it is expected that the relationship between gesture and result will typically be selected so that it is intuitive for the user.

Likewise, jump cuts and similar effects can easily be implemented, for example, using a gesture or button that, when given or set, stops capture of a playing visual source (although the visual source continues to play) and, when repeated or unset, restarts capture of that visual source again.

In still more complex implementations, various video transitions and/or filters can optionally be incorporated as additional or alternative enhancements, either through gestures or by providing buttons or other icons on the screen that can be selected once a tile is displaying. Example transitions can include, but are not limited to, 2D or 3D transitions such as: mix, dissolve, fade, cross-fade, pixelation, wipe, light flash, iris, channel map, slide, explode, swing, spin, stretch, object zoom, cube, etc. Example filters can include color and/or texture filters like sepia, black & white, dust, scratch, negative, vignette, blur, brightness, contrast, vibrance, saturation, exposure, etc. The particular transitions and/or filters that can be available are limited only by the capabilities of the particular implementation in that regard. Similarly, the approach to selection, i.e. by gesture, button or other approach, is one of design choice.

Thus, with these more complex implementations, the system can be configured such that, when the user selects a particular tile, and the visual source associated with that tile begins to be displayed, the optional enhancements available, i.e. effects, transition and/or filters, become selectable such that, upon selection, the selected effect, transition or filter will be applied to the then-displayed visual source.

Similarly, depending upon the particular implementation, a given mixing is finished when the user indicates this by taking some "stop" action or, in cases where the audio does not continuously repeat (either by looping or random selection within a playlist), the audio has played through to the end, or after a specified period of time.

Concurrent with the user's actions, depending upon the particular implementation, the result of the user's mixing actions can be output to an external display, and/or stored in a file for later playback, as will be described in greater detail below.

Figure 4:
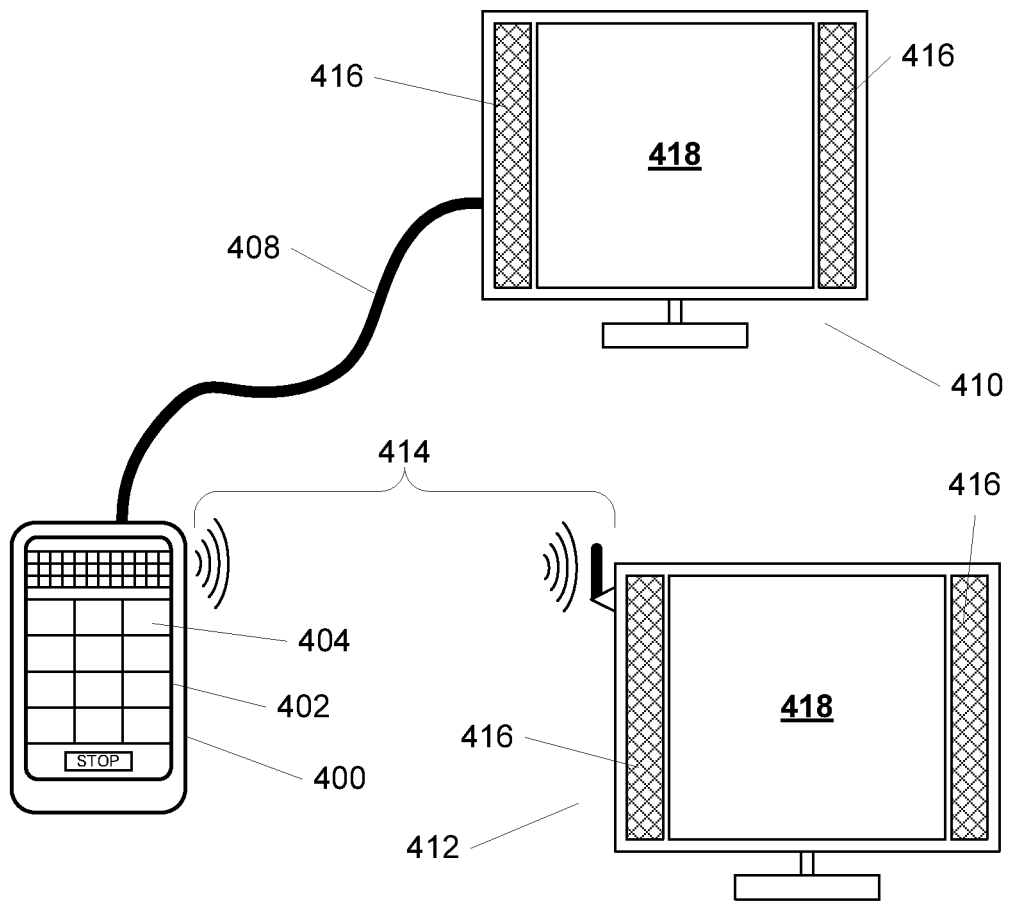
FIG. 4 illustrates, in simplified form, a device that incorporates one variant implementation as described herein.
Figure 5:
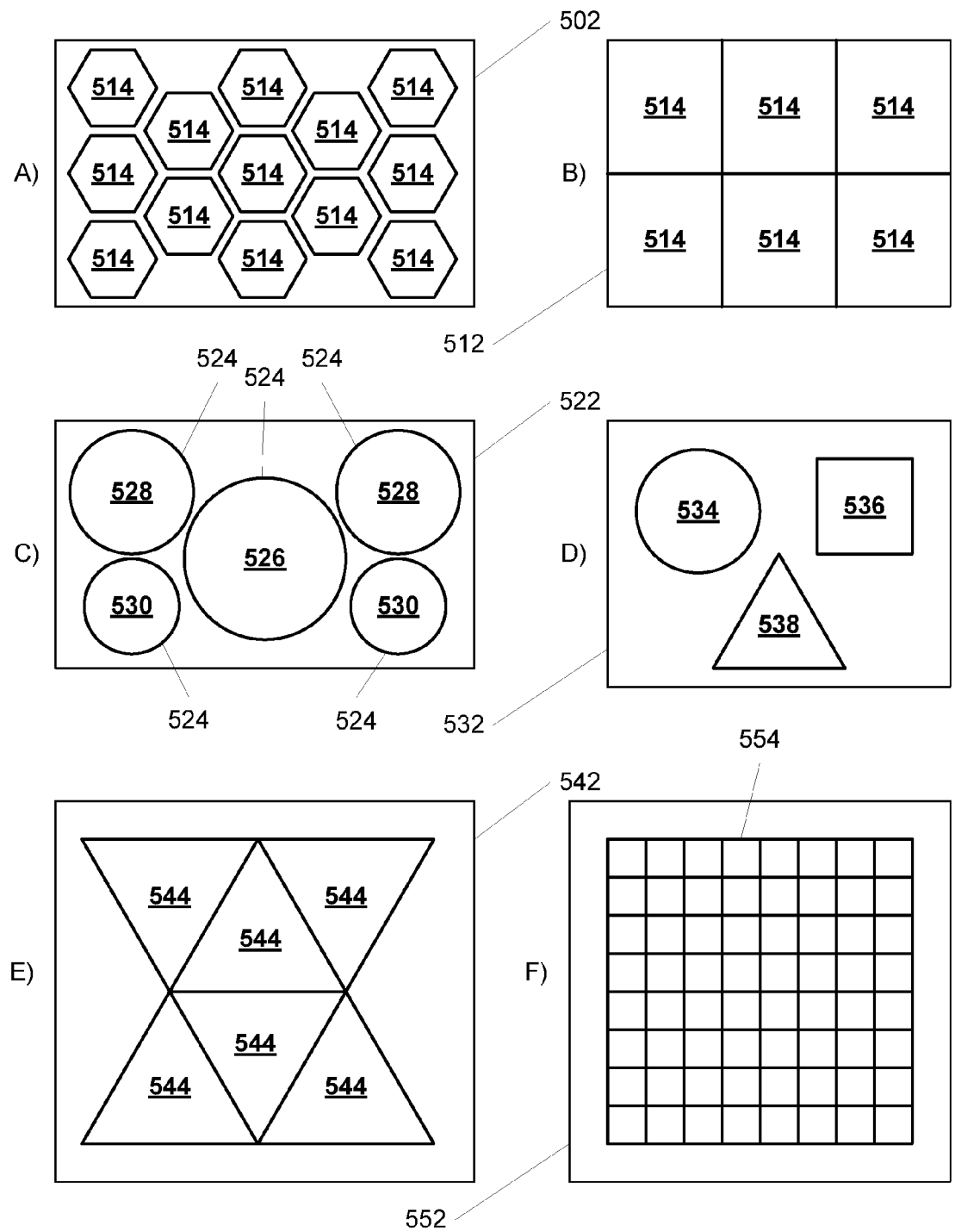
FIGS. 5A-5F illustrate, in simplified form, some representative examples of touch interfaces having different configurations of tiles.

FIG. 4 illustrates, in simplified form, a device 400 that incorporates one variant implementation as described herein. As shown, the device 400 includes a touch interface 402 that is running application software as described herein which configures the areas that make up the tiles, in this case, a set of twelve selectable tiles 404 arranged as three columns by four rows and assigns visual sources to each tile. In addition, the example implementation shown also includes a set of selectable buttons 406 that, when selected, cause a transition, filter or effect to be applied to the then-playing video. The device 400 is coupled to an external display such as a monitor or projector. In this example configuration, the device 400 is coupled to two monitors; via a wired connection 408 to one external monitor 410, and to another remote external monitor 412 via a wireless connection 414. In this manner, the output is sent to both monitors 410, 412, with the underlying audio playing via the speakers 416 of the monitors 410, 412 and the video mix being displayed on the monitor 410, 412 screens 418 in synch with the audio as mixed.

At this point it should be noted that, in between the mixing selection and output, a process known in the video art as "compositing" may need to occur in order to combine all of the selections and any optional applied transitions, filters or effects into a single multimedia file using software generally referred to in the video as a "compositing engine". In such cases, depending upon how the application is configured and the processing capability of the particular device, it should be noted that output of the final mix can: (i) occur in real time if compositing can occur on-the-fly, (ii) be delayed for a period of time necessary to composite at least some portion (if not all) of the mix, or (iii) be sent a short time or well after both mixing and compositing are complete. Since compositing and compositing engines are known and use different techniques the details will not be described herein except to the extent needed to ensure understanding of the subject matter herein.

As a final user interface note, it should be understood that the number, shape and arrangement of the tiles within the touch interface will be a function of the particular implementation and design choice. Moreover, some implementations of the touch interface may allow for a user to select one or more of: the number of tiles, their size, geometric shape or peripheral boundaries, or their placement. In this regard, FIGS. 5A-5F illustrate, in simplified form, some representative examples of touch interfaces 502, 512, 522, 532, 542, 552 having different configurations of tiles. For example, the simplified touch interface 502 illustration in FIG. 5A contains thirteen hexagonal tiles 504 arranged in a type of honeycomb configuration. In contrast, the simplified touch interface 512 illustration in FIG. 5B contains vertical rectangular tiles 514 arranged in an array of two rows and three columns. The simplified touch interface 522 illustration of FIG. 5C contains five circular tiles 524 in three different sizes 526, 528, 530. The simplified touch interface illustration 532 of FIG. 5D contains three tiles 534, 536, 538, each of differing shapes. The simplified touch interface 542 illustration of FIG. 5E contains six abutting triangular tiles 544 arranged in two rows, with the center triangle in each row being inverted relative to its adjacent neighbors in that row. Finally, the simplified touch interface 552 illustration of FIG. 5F contains a square array of sixty-four square tiles 554.

Thus, from the above it should be appreciated that the permutations of number, shape and arrangement of the tiles that can be used with the instant system and method are enormous.

Figure 6:
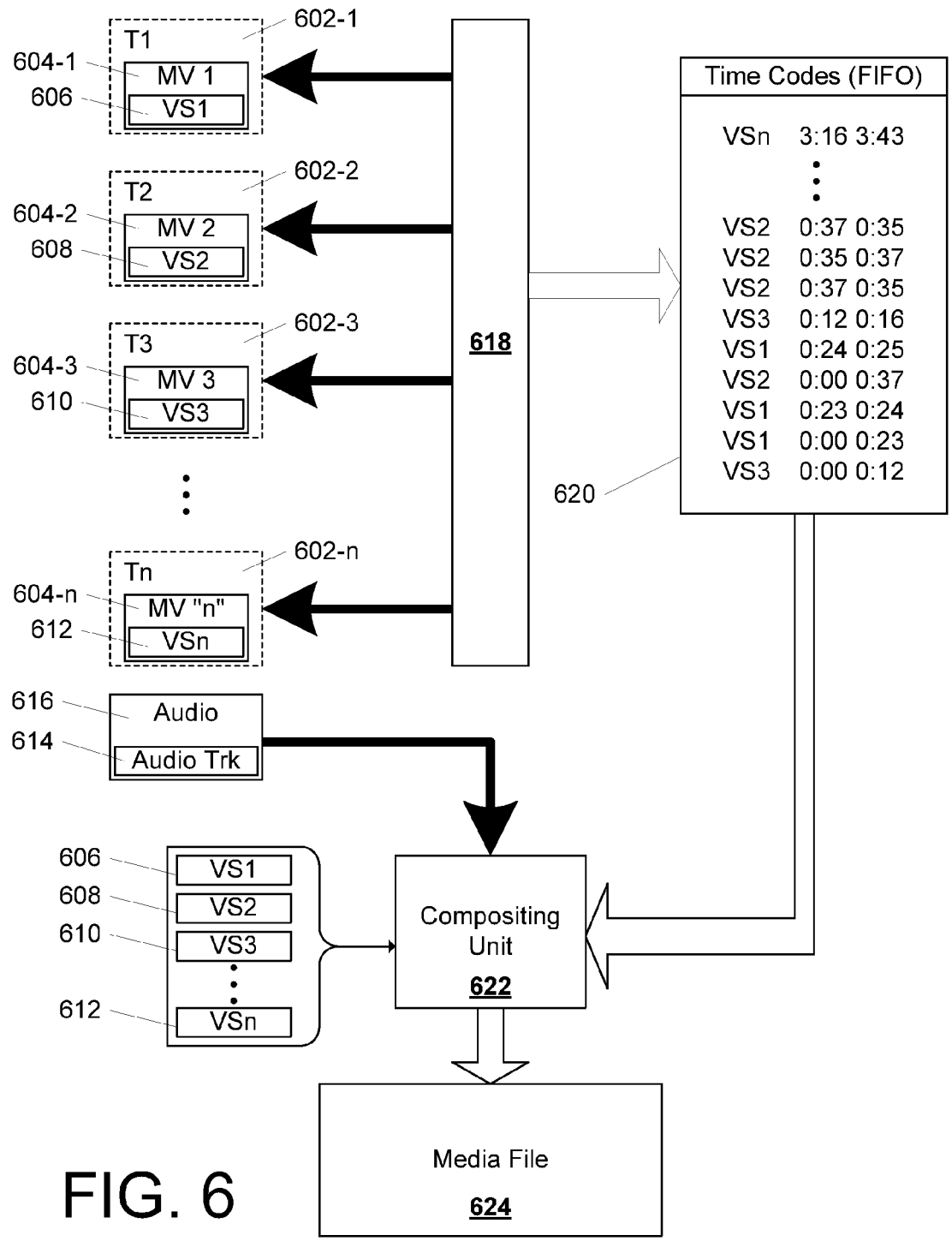
FIG. 6 illustrates, in simplified form, the conceptual components of one representative example implementation embodied in a device suitable for use as described herein.
Figure 7:
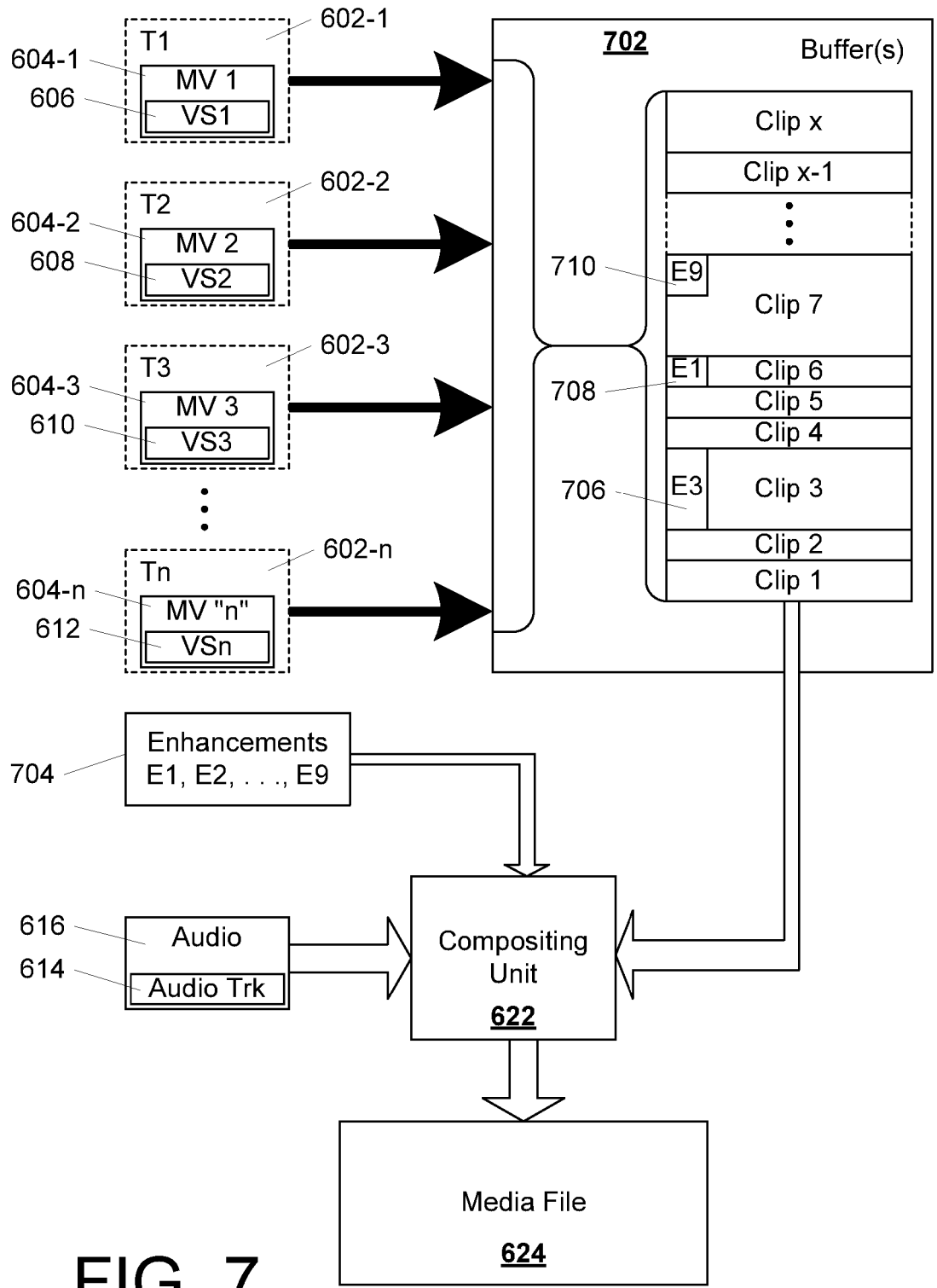
FIG. 7 illustrates, in simplified form, the conceptual components of an alternative representative example implementation embodied in a device suitable for use as described herein.
Figure 8:
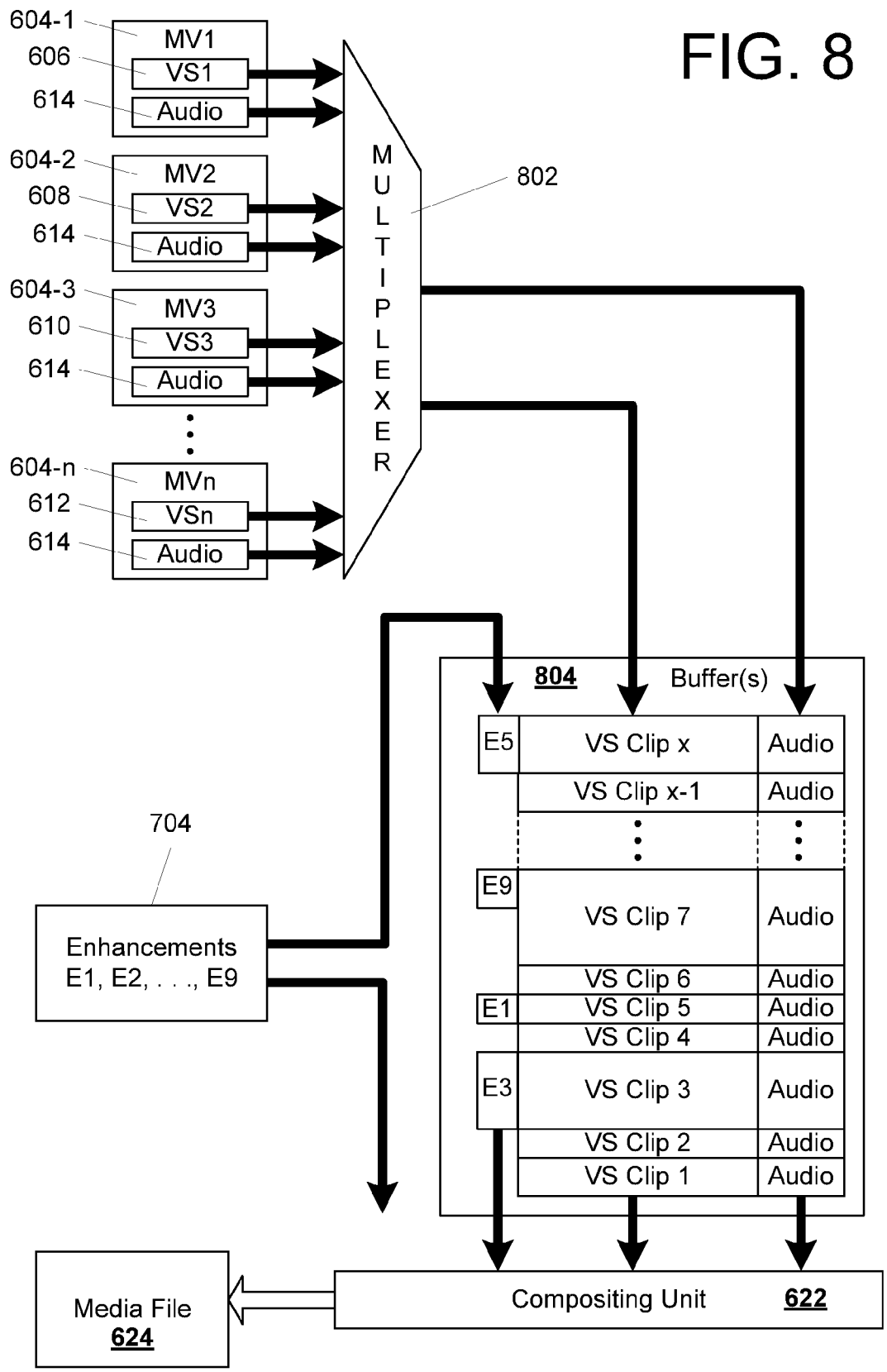
FIG. 8 illustrates, in simplified form, the conceptual components of an alternative representative example implementation embodied in a device suitable for use as described herein.

Having described various aspects from the user perspective, some example back-end configurations and arrangements will now be presented in connection with FIGS. 6-8.

FIG. 6 illustrates, in simplified form, the conceptual components of one representative example implementation embodied in a device 100 suitable for use as described herein.

As described above the touch interface (not shown) includes, as shown in the example of FIG. 6, multiple tiles 602-1, 602-2, 602-3, 602-n. Each of those tiles 602-1, 602-2, 602-3, 602-n has an associated instance 604-1, 604-2, 604-3, 604-n of a media viewer associated with them. As shown in this example implementation, each instance 604-1, 604-2, 604-3, 604-n of media viewer has been loaded with a visual source 606, 608, 610, 612 (in this case all movie files) which, when selected, will play within that tile.

In addition, an audio track 614 is loaded into an instance of an audio player 616 which, depending upon the particular implementation, can be a separate player or can be the audio player portion of one of the media viewer instances 604-1, 604-2, 604-3, 604-*n*. In the example of FIG. 6, the audio player 616 is separate from the media viewer instances 604-1, 604-2, 604-3, 604-*n*. In use, when a user selects one of the tiles 602-1, 602-2, 602-3, 602-*n*, the instance 604-1, 604-2, 604-3, 604-*n* associated with that tile 602-1, 602-2, 602-3, 602-*n* begins playing its visual source 606, 608, 610, 612 within that tile 602-1, 602-2, 602-3, 602-*n* for viewing by the user. In addition, upon selection of the first tile, the audio player 616 begins playing the audio track 614 as well. Concurrent with this initiation of playing, a recorder 618 within the system is monitoring all media viewer instances 604-1, 604-2, 604-3, 604-*n* and, with this implementation, captures the time codes 620 for each visual source 606, 608, 610, 612 when it is selected and stopped in a first-in/first-out (FIFO) listed manner. Then a compositing engine 622 uses the time codes 620 to sequentially retrieve from storage, and composite, the portions of each visual source 606, 608, 610, 612 that were selected by the user (as indicated by the time codes 620), and the audio track 614, into a single media file 624. Depending upon the particular implementation, the captured time codes 620 can be buffered, otherwise stored in volatile memory, or can be written to a file for more permanent retention, and potential use at a later time. Likewise, the resulting media file 624 can be written to storage and/or output to somewhere else via the device I/O.

FIG. 7 illustrates, in simplified form, the conceptual components of an alternative representative example implementation embodied in a device 100 suitable for use as described herein.

As shown in FIG. 7, and described in connection with FIG. 6 (and thus not belabored here), the touch interface (not shown) includes multiple tiles 602-1, 602-2, 602-3, 602-*n*, each having an associated instance 604-1, 604-2, 604-3, 604-*n* of a media viewer associated with them, with each instance 604-1, 604-2, 604-3, 604-*n* of media viewer having been loaded with a visual source 606, 608, 610, 612 which, when selected, will play within that tile. Similarly, an audio track 614 is loaded into an instance of an audio player 616.

Also, as with FIG. 6, the example implementation of FIG. 7 includes a compositing engine 622 which is used to composite selected parts of each visual source 606, 608, 610, 612 that were selected by the user, and the audio track 614, into a single media file 624.

However, the implementation of FIG. 7 differs from that of FIG. 6 in that, instead of capturing time codes as each visual source is selected, with this implementation, in addition to displaying the selected visual source 606, 608, 610, 612, each playing media viewer instance 604-1, 604-2, 604-3, 604-*n* sequentially feeds one or more FIFO buffer(s) 702 that sequentially capture(s), as clips, the actual played portion of each selected visual source 606, 608, 610, 612 itself, which may also be optionally be directly stored for later use. Optionally, and alternatively, information relating to the captured clips that interrelate them to their source can be captured and stored for more permanent retention and/or later use Moreover, the implementation of FIG. 7 includes optional enhancements 704 that can be applied to a playing visual source. As such, the buffer(s) also capture the enhancement or otherwise includes some indication of any selected enhancements to be applied and where they should start and stop if not affecting the entire clip, or the enhancements themselves. As shown, this implementation includes at least nine enhancements. Clip 3 has had one enhancement 706, enhancement "E3", applied, Clip 6 has had another enhancement 708, enhancement "E1", applied, and Clip 7 has had still another enhancement 710, enhancement "E9", applied, but only to a portion near the end. Thus, with this implementation, the actual clips and indicators of the selected optional enhancements are fed to the compositing engine 622. The compositing engine 622 then applies the enhancements to the clips and composites the clips, the enhanced clips and the audio track 614 into the media file 624 as the overall mix.

FIG. 8 illustrates, in simplified form, the conceptual components of an alternative representative example implementation embodied in a device 100 suitable for use as described herein.

As shown in FIG. 8, and described in connection with FIGS. 6 and 7, the touch interface (not shown) includes multiple tiles 602-1, 602-2, 602-3, 602-*n*, each having an associated instance 604-1, 604-2, 604-3, 604-*n* of a media viewer associated with them, with each instance 604-1, 604-2, 604-3, 604-*n* of media viewer having been loaded with a visual source 606, 608, 610, 612 which, when selected, will play within that tile. In addition, and unlike with FIGS. 6 and 7, the audio track 614 is loaded into the audio playing portion of each instance 604-1, 604-2, 604-3, 604-*n* of the media viewers.

Also, as with FIGS. 6 and 7, the example implementation of FIG. 8 includes a compositing engine 622 which is used to composite selected parts of each visual source 606, 608, 610, 612 that were selected by the user, and the audio track 614, into a single media file 624 using any appropriate compositing technique.

However, the implementation of FIG. 8, includes a multiplexer 802 which is configured to direct both the audio and each selected clip from a visual source 606, 608, 610, 612 from the associated instance 604-1, 604-2, 604-3, 604-*n* to one or more buffer(s) 804. Likewise, this implementation includes enhancements 704 that can be applied to any appropriate visual source 606, 608, 610, 612. As shown, an indication of any enhancement that is to be applied to any portion of a clip is buffered and, during compositing, the particular enhancement is actually applied by the compositing engine 622.

With this configuration, as soon as any tile is selected to start a mix, the audio track begins playing in all instances 604-1, 604-2, 604-3, 604-*n* at the same time, even though only the selected visual source associated with that tile is played. In addition, the selection causes the multiplexer 802 to direct that selected audio track and visual source to the buffer(s). Upon selection of another tile, the multiplexer 802 will switch to directing the audio track from that instance along with its selected visual source to the buffer(s).

Alternatively, for any implementation described herein, depending upon the particular implementation and enhancement, the enhancement itself could be stored in a buffer or applied to the clip prior to storage.

Figure 9:
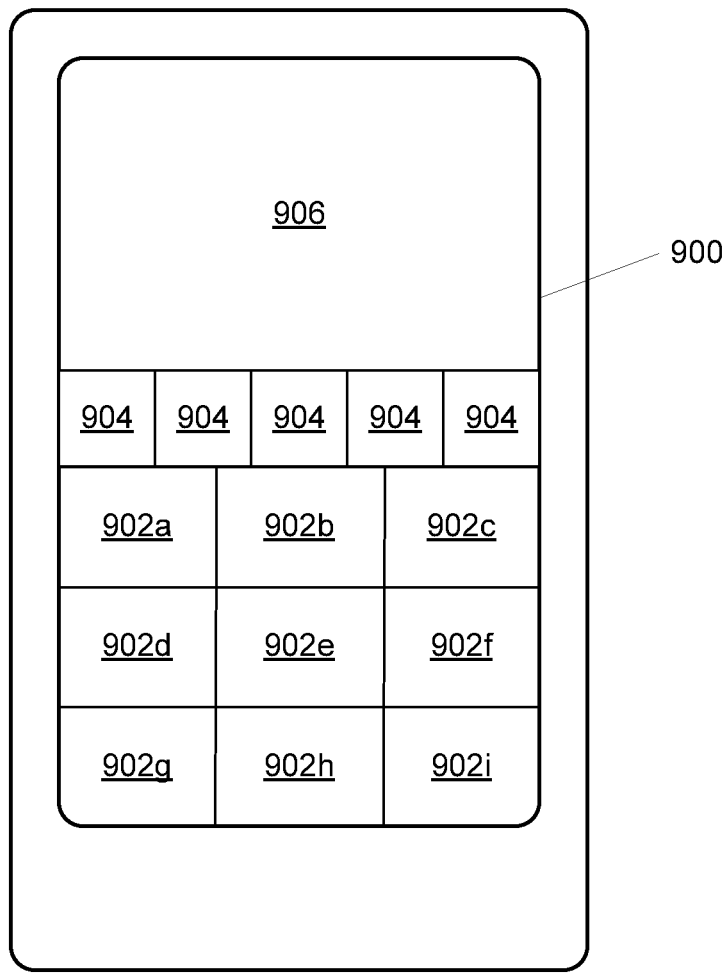
FIG. 9 illustrates, in simplified form, an implementation of an alternative touch interface configuration suitable for some implementations.

Based upon the foregoing, FIG. 9 illustrates, in simplified form, an implementation of an alternative touch interface 900 configuration suitable for some implementations.

As shown in FIG. 9, this touch interface 900 configuration including multiple tiles 902*a*, 902*b*, 902*c*, 902*d*, 902*e*, 902*f*, 902*g*, 902*h*, 902*i*, similar to those described herein, in this case a three by three array of nine tiles, each associated with media viewer instances as described herein. In addition, this touch interface 900 configuration includes a set of selectable buttons 904 for selecting enhancements to be applied to a video source as described herein.

However, the touch interface 900 configuration of this implementation also includes an enlarged display area 906. Depending upon the particular implementation, the enlarged display area can be used, for example, to show the output of the compositing engine as the mix is being generated or can show each selected visual source as it plays. In this manner, rather than viewing each visual source in its selected tile, a user can view the mix in one place as the mixing proceeds. Note that, depending upon the particular implementation, in some implementations, a selected visual source can still also play within its respective tile, while in other implementations, when a tile is selected the selected visual source will only display within the enlarged display area 906 and the look of the selected tile will be changed to indicate its selection. In either case, as with other implementations described herein, to the extent gestures would be applied within a tile area, the selected tile can still be used for that purpose.

Figure 10:
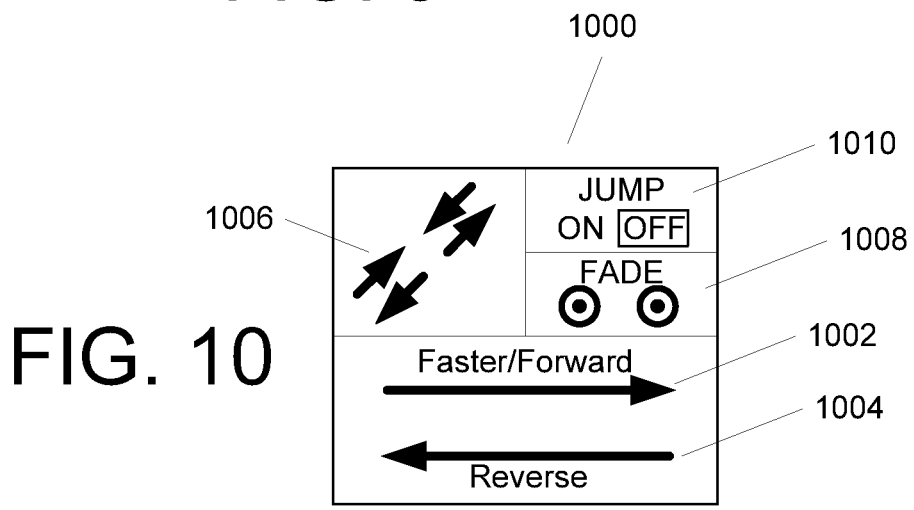
FIG. 10 illustrates, in simplified form, an example of a selected tile in one example implementation like shown in FIG. 9.

FIG. 10 illustrates, in simplified form, an example of a selected tile 1000 in one example implementation like shown in FIG. 9, one in which the playing of a selected visual source only appears in the enlarged display area 906. As shown, the selected tile 1000 is divided into sub-areas and includes indications of the gestures that can be used and what they would do. For example, a left to right sweep 1002 is indicted as causing faster forward playback, whereas a right to left sweep 1004 is indicated as causing a reverse playback. Thus, repeating alternating left to right and right to left sweeps could be used to create the video analog to a disc jockey's "scratch" effect. Similarly, the diagonal facing and opposing arrows 1006 are used to indicate the multi-touch gestures for "zoom in" or "zoom out." A two finger "tap" 1008 is shown to indicate triggering of a fade effect, and a single finger tap 1010 will turn on or off "capture" to create a jump effect in the display area 906. Note here that, depending upon the particular implementation, the tiles 1000 can be configured to only recognize a given gesture in a given sub-area of the tile 1000, or if the gestures are discrete, no such limitation may be needed.

Optionally, some implementations can further include an "edit" mode. Selection of and entry into the "edit" mode can be through any suitable approach, for example, selection of a button, using a particular gesture, revealing and selection of an item on a menu or an icon. In general, "edit" mode cannot be entered during creation of a mix (i.e. while the audio and any video is playing). When "edit" mode is entered, the user can make various changes, for example, assign a new or different video source to an individual tile, edit the start and/or end points of a video source or clip, applying an enhancement to a video source associated with a particular tile such that the enhanced video source will itself be treated as a new video source, adding or replacing an audio track or modifying aspects of the audio track, like sound level, treble/bass, equalizer settings, etc.

In some implementations, when the "edit" mode is entered and a specific tile is selected, the video (and/or audio) source content in the individual tiles will be displayed in an enlarged editor frame for editing. In other implementations, selection of a tile will bring up a new editing screen and, when editing is complete, the user will be returned to the original tile array screen. Depending upon the particular implementation, in some cases, selection of the "edit" mode can initiate running of a pre-configured version of a conventional editing program, by way of non-limiting example, iMovie, Final Cut or Avidemux and may or may not directly link back to the tiled mixing screen when editing is finished.

In another variation of the "edit" mode, in some implementations, as briefly noted above a user will have the ability to open an existing mix (that they created or was created by someone else) and use the visual source and audio content in that mix as sources that can be remixed and/or edited. Depending upon the particular implementation, this can be done by entering a "remix" extension of the edit mode, entering the "edit" mode when a composited mix is loaded, or by indicating a desire to "remix" followed by selection of an existing mix to remix. Selection of, and entry into, the "remix" mode or extension to the "edit" mode can be through any suitable approach, for example, selection of a button, using a particular gesture, selection of an item on a menu or an icon, etc. In general, an existing mix can be any existing mix created according to the approach described herein, for example, it could be a mix previously created by the user or one created by someone else and accessed by, for example, accessing or logging on to a website or other repository where users can upload (and optionally categorize) mixes they create.

Upon entry into the remix mode in conjunction with a particular previously-created mix, a grid of the content making up that mix will be pre-populated with the content from the existing mix loaded into tiles as if it had been a visual source created by the user and not yet composited, for example, with the start point for each piece already pre-set. At this point, the user can start mixing, including being able to use optional available effects, transitions or filters to individual tile content, as described above. At this point it should be noted that, depending upon the particular implementation, the remix mode may require different operation as follows:

With some implementations, in order to be remix-able, the system may need to have access to the information used to composite, or created or compiled during compositing, the mix. Depending upon the particular implementation, this could be available from information appended to the file created as part of the compositing process or associated with the file during the compositing process as a separate file. In such implementations, when a remix is selected, that information can be used to de-composite the mix.

In some cases, the information can be used to directly identify source material such that it can be non-duplicatively assigned to tiles. This could be accomplished in, for example, the following two ways (or using any other known decompositing and de-duplicating approach).

First, if the sources and information used to composite the mix are directly available, the mix can simply non-duplicatively load the sources indicated in the compositing information.

Second, if the original sources were not available, the information could still be used to respectively break up the audio and video streams. For example, if the internal or associated information indicates that the third clip and the eighth clip come form the same source and the third clip is from time 3:32 through 4:02 of that source and the eighth clip is from 3:40 through 3:50, only the video part corresponding to the third clip would need to be assigned to a tile and the eighth clip could be disregarded, whereas, if the eight clip was for the time period of 3:55 through 4:10, the entirety of one clip could be selected and the non-overlapping portion of the other could be per-pended or appended to it. Alternatively, for example, the de-compositing could be performed by separating audio and video into two streams and breaking up the two streams into all their non-duplicative component parts and perform a matching to identify and consolidate the components into sources that could be assigned to tiles. For example, if the video contained repeatedly alternating 3 second clips from two different videos, only one 3 second clip from each video would be segregated and assigned to a tile. Likewise, if the mix contained a video or audio clip that was 5 seconds long and the mix later contained a 2 second subset of that clip, only the 5 second clip would need to be assigned to a tile. Moreover, if the underlying device 100 has suitable capabilities, an image/audio matching program could be used in the background to extract the largest clip containing certain content, delete all instances of identical content, and pre-pend/append non-overlapping content to the partially overlapping content so as to create a unified clip. The details of this type of image and/or audio recognition and selection, being known in the art, need not be described herein.

Once the sources have been assigned to tiles, the user can then swap content in one or more tiles for alternative content and create a new mix as described herein.

As a final note, it should be understood that aspects of the foregoing functions and compositing engine can be implemented in hardware, software or some combination of the two, and it is well known that, in many cases, certain functions are interchangeably constructable, whether implemented as hardware or software (i.e. programming can be written to effect the same action as hardware can implement and vice versa). Thus, it should be appreciated that two different implementations can be constructed to perform as described herein in an identical manner, but one may be implemented with extensive software programming, while the other may be implemented predominantly with hardware and using minimal software or programming.

It should be understood that this description (including the figures) is only representative of some illustrative embodiments. For the convenience of the reader, the above description has focused on a representative sample of all possible embodiments, a sample that teaches the principles of the invention. The description has not attempted to exhaustively enumerate all possible variations. In addition, as described, some variations or features may be mutually exclusive in that they cannot be simultaneously present in a single embodiment. That alternate embodiments may not have been presented for a specific portion in the context of the whole, or that further undescribed alternate embodiments may be available for a portion, is not to be considered a disclaimer of those alternate embodiments. One of ordinary skill will appreciate that many of those undescribed embodiments incorporate the same principles of the invention as claimed and others are equivalent.

What is claimed is:

1. A video mixing computer apparatus comprising:
   a computing device including at least one processor, storage and input/output (I/O) hardware;
   a touch interface associated with the computing device having multiple concurrently visible selectable tiles delineated therein, at least some of the multiple tiles each having associated therewith a media viewer, each media viewer being capable of displaying a visual source in response to selection of the associated tile;
   a compositing engine within the computing device;
   the at least some tiles, the associated media viewers, and the compositing engine configured to interoperate such that, when a user selects a first tile, a part of a first visual source associated with the first tile will be played for the user by a first media player associated with the first tile, and when the user then selects a second tile, a part of a second visual source associated with the second tile will be played for the user by a second media player associated with the second tile, and concurrent with the playing of the part of the first visual source and the part of the second visual source, information relating to the part of the first visual source and the part of the second visual source will be captured for use by the compositing engine to create a media file as a sequential mix of the first visual source and second visual source corresponding to the user's selections' timings and durations.

2. The video mixing computer apparatus of claim 1, further comprising:
   an audio player, stored within the computing device; and
   at least one audio track, stored within the computing device,
      wherein a first part of the at least one audio track is played in conjunction with playing the part of first visual source and a second part of the at least one audio track is played in conjunction with playing the part of second visual source, and
      wherein the information includes audio track information such that, when the media file is created, the mix will include the part of the first visual source synchronized with the first part of the at least one audio track, and the part of the second visual source synchronized with the second part of the at least one audio track.

3. The video mixing computer apparatus of claim 1, wherein the computing device is one of:
   a personal computer, a tablet computer, a gaming console or a smart phone.

4. The video mixing computer apparatus of claim 1, wherein the computing device comprises at least one of:
   a touch screen, a projected user interface, a multi-touch projected display, or a gestural interface, via which the user can interact with the touch interface.

5. The video mixing computer apparatus of claim 1, further comprising:
   at least one enhancement that can be applied to at least one of the first visual source or the second visual source as part of the creating of the media file.

6. The video mixing computer apparatus of claim 5, wherein the at least one enhancement comprises a transition, an effect or a filter.

7. The video mixing computer apparatus of claim 1, wherein the at least some tiles of the touch interface have a user selectable configuration.

8. The video mixing computer apparatus of claim 7, wherein the user selectable configuration allows the user to alter at least one of:
   (i) a number of tiles,
   (ii) a tile shape, or
   (iii) a tile placement.

9. The video mixing computer apparatus of claim 1, wherein the at least some tiles of the touch interface are arranged in an organized array.

10. The video mixing computer apparatus of claim 9, wherein the organized array is a rectangular array.

11. The video mixing computer apparatus of claim 9, wherein at least one of the at least some tiles of the touch interface have a shape that is:
    hexagonal, rectangular, triangular, or circular.

12. The video mixing computer apparatus of claim 9, wherein at least two of the at least some tiles of the touch interface have shapes that are different from each other.

13. The video mixing computer apparatus of claim 9, wherein at least two of the at least some tiles of the touch interface have sizes that are different from each other.

14. The video mixing computer apparatus of claim 1, further comprising a buffer to which at least one of the visual sources selected by the user via the touch interface will be directed.

15. The video mixing computer apparatus of claim 14, wherein the buffer is a FIFO buffer.

16. A method performed in a computer device, the method comprising:

receiving a selection of a first tile via a touch interface, the first tile having associated with it a first visual source;

in response to the selection of the first tile, playing the first visual source until a selection of a second tile is received;

upon receiving the selection of the second tile, halting the playing of the first visual source and begin playing of the second visual source until a selection of a different tile is received, the different tile being one of the first tile or an other tile; and creating a single playable media file from at least the first visual source and second visual source, the media file comprising a portion of the first visual source having a start point corresponding to the selection of the first tile and an end point corresponding to a time that the selection of the second tile occurred, followed by a portion of the second visual source having a start point corresponding to the selection of the second tile and an end point corresponding to a time that the selection of the different tile occurred.

17. The method of claim 16 wherein the creating the single media file comprises:

compositing at least the portion of the first visual source and the portion of the second visual source.

18. The method of claim 17, wherein the compositing further comprises:

applying at least one transition, effect or filter to the portion of the first visual source or the portion of the second visual source.

19. The method of claim 17, wherein the compositing further comprises:

incorporating a portion of an audio track into the single media file selection-synchronized with at least one of the portion of the first visual source or the portion of the second visual source.

20. The method of claim 16, further comprising:

receiving a gesture via the touch interface identifying a transition, effect or filter to be applied to at least one of the portion of the first visual source or the portion of the second visual source.

* * * * *